(12) United States Patent
Creber

(10) Patent No.: US 12,162,309 B2
(45) Date of Patent: Dec. 10, 2024

(54) TOOL FOR FITTING A WHEEL TO A WHEEL HUB OF A VEHICLE

(71) Applicant: John Lawrence Creber, Bradford (GB)

(72) Inventor: John Lawrence Creber, Bradford (GB)

( * ) Notice: Subject to any disclaimer, the term of this patent is extended or adjusted under 35 U.S.C. 154(b) by 326 days.

(21) Appl. No.: 17/543,895

(22) Filed: Dec. 7, 2021

(65) Prior Publication Data

US 2022/0176740 A1 Jun. 9, 2022

(30) Foreign Application Priority Data

Dec. 9, 2020 (GB) ...................................... 2019419

(51) Int. Cl.
*B25B 13/46* (2006.01)
*B60B 29/00* (2006.01)

(52) U.S. Cl.
CPC .................................. *B60B 29/001* (2013.01)

(58) Field of Classification Search
CPC ..... B60B 29/003; B60B 29/001; B25G 1/063; B25B 13/46
See application file for complete search history.

(56) References Cited

U.S. PATENT DOCUMENTS

| 1,494,269 A * | 5/1924 | Meyers ................. B60B 29/001 29/273 |
| 3,389,453 A | 6/1968 | Tarter et al. |
| 4,858,298 A | 8/1989 | Fleischanderl |
| 4,949,448 A | 8/1990 | Hebnes |
| 10,913,311 B1 * | 2/2021 | Dirnbeck ............ B25B 27/0035 |
| 11,346,402 B2 * | 5/2022 | Tsai ...................... F16D 3/2052 |
| 11,433,512 B1 * | 9/2022 | Doroslovac ............... F16C 3/02 |
| 2007/0000097 A1 * | 1/2007 | Smith .................... B25G 1/005 16/436 |
| 2022/0176740 A1 * | 6/2022 | Creber .................. B60B 29/001 |

FOREIGN PATENT DOCUMENTS

| FR | 681492 A | 5/1930 |
| FR | 686360 A | 7/1930 |
| GB | 723297 A | 2/1955 |
| GB | 783614 A | 9/1957 |
| GB | 2146958 A | 5/1985 |
| JP | 2001191706 A | 7/2001 |

* cited by examiner

*Primary Examiner* — Lee D Wilson
(74) *Attorney, Agent, or Firm* — COATS & BENNETT, PLLC

(57) ABSTRACT

A tool set for fitting a wheel to a wheel hub of a vehicle. The tool set comprises a wheel carrying bar and a support peg. The wheel carrying bar is configured to pivotably engage with the support peg.

14 Claims, 12 Drawing Sheets

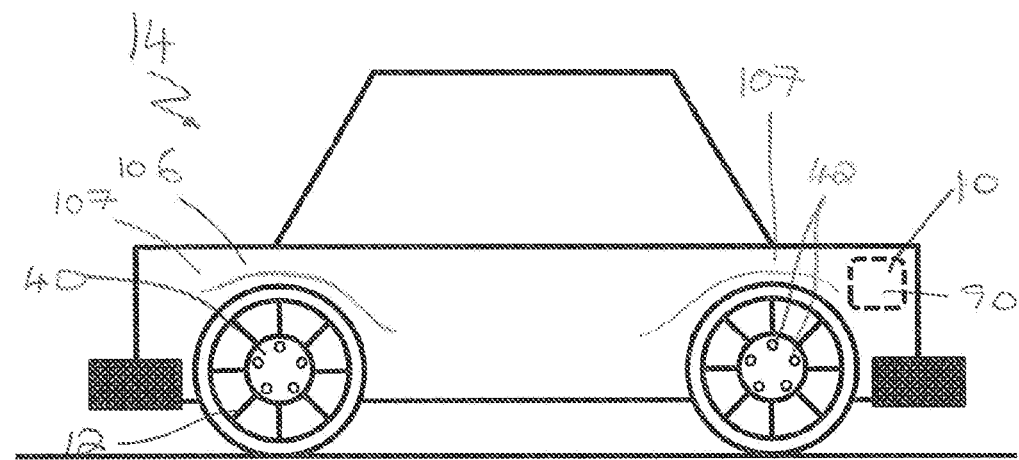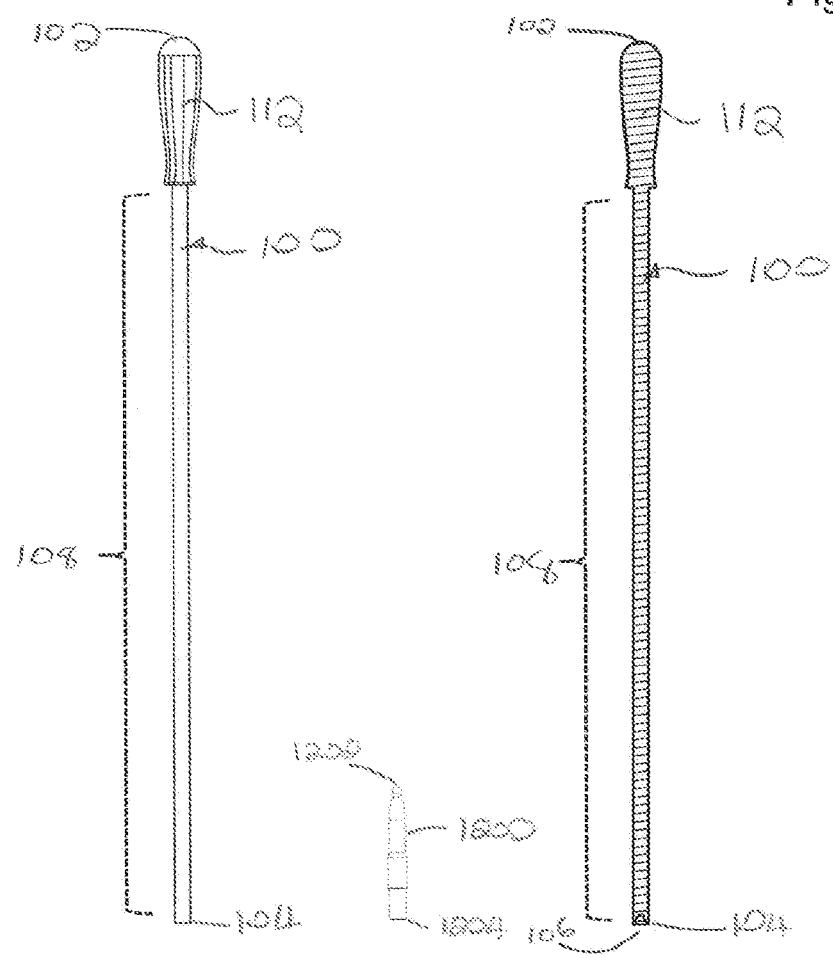
Fig.1
Fig.4  Fig.2  Fig.5  Fig.3

TOOL FOR FITTING A WHEEL TO A WHEEL HUB OF A VEHICLE

The present disclosure relates to a tool.

In particular the disclosure is concerned with a tool, tool set or tool kit for fitting a wheel to a wheel hub of a vehicle.

BACKGROUND

Conventionally wheels are fitted to a receiving wheel hub on a vehicle by a user lifting the wheel and shifting the wheel's position to achieve location while supporting its weight. Wheels with tyres fitted are generally so heavy that a user must lift the wheel with both hands and then support the wheel whilst fixing the wheel in place on the wheel hub with a nut or bolt. This requires a large amount of physical effort and, because the user is generally lifting the wheel at least at part arm's length, places stress on a user's back.

An amateur replacing a wheel on a car may sit on the ground and support the wheel on their own body (for example, their legs) to help them get the wheel in place on the hub.

A mechanic may lift the vehicle to a comfortable working height on ramps so that the wheel can be lifted close to chest height and hence held with reduced effort while the wheel is being located, although lifting the wheel to such a height commonly causes injury.

Hence a tool which enables easy location of a wheel onto a wheel hub of a vehicle, and reduces the amount of physical effort required by a user, is highly desirable.

SUMMARY

According to the present disclosure there is provided apparatus and method as set forth in the appended claims. Other features of the invention will be apparent from the dependent claims, and the description which follows.

Hence there is provided a tool set (10) for fitting a wheel (12) to a wheel hub (40) of a vehicle (14). The wheel hub (40) comprises fixing features (42) for fixing the wheel (12) to the wheel hub (40).

The tool set (10) comprises a wheel carrying bar (100) comprising a first end (102), a second end (104), and a first wheel support region (108) which extends away from the first end (102) to a first bearing coupling (106) provided at the second end (104).

The tool set further comprises a support peg (200, 1200) comprising a third end (202, 1202), fourth end (204, 1204), a second bearing coupling (206) being provided at the third end (202), 1202), and a second wheel support region (208) extending away from the second bearing coupling (206) towards a socket (210, 1210) provided at the fourth end (204, 1204). The socket (210, 1210) may be configured to be engaged with or located in/on one of the hub fixing features (42). The first bearing coupling (106) may be configured to pivotably engage with the second bearing coupling (206) to thereby form a pivotable joint (140).

The first bearing coupling (106) and the second bearing coupling (206) may be configured to form a floating joint while pivotably engaged.

The first bearing coupling (106) comprises an opening (110) at the second end (104) from which extends a concave bearing surface (120) which defines a cavity (130) centred on a first coupling axis (128).

The second bearing coupling (206), at the third end (202, 1202), comprises a male engagement member (230) with a convex bearing surface (220) which is centred on a second coupling axis (228).

The first bearing coupling (106) is configured to receive the second bearing coupling (206).

The concave bearing surface (120) of the first bearing coupling (106) may have a convergent lead-in region (122) which reduces in diameter from the opening (110) to a minimum diameter (Dmin), from which extends a support region (124) comprising a spherical surface (127).

A first cylindrical region (126) of the same diameter as the minimum diameter (Dmin) may extend between the convergent lead-in region (122) and the spherical surface (127).

The convergent lead-in region (122) may comprise a first frustoconical region (122-1) extending a length X1 at a first angle of inclination A1 relative to the first coupling axis (128).

The convergent lead-in region (122) may comprises a second frustoconical region (122-2) extending a length X2 at a second angle of inclination A2 relative to the first coupling axis (128). The second frustoconical region (122-2) may extend from the first frustoconical region (122-1). The first frustoconical region (122-1) may be spaced apart from the opening (110) by the second frustoconical region (122-2). The first angle of inclination A1 being less than the second angle of inclination A2.

The convex bearing surface (220) of the second bearing coupling (206) may be provided as a spherical surface (227). A second cylindrical region (226), centred on the second coupling axis (228), may extend a length X3 from the convex bearing surface (220) along the second coupling axis (228) some of the way towards the socket (210, 1210). The convex bearing surface (220), the second cylindrical region (226) and socket (210, 1204) may be provided in series along the second coupling axis (228).

The length X1 of the first frustoconical region (122-1) of the first bearing coupling (106) may be substantially the same as the length X3 of the second cylindrical region (226) of the second bearing coupling (206).

The second wheel support region (208) may comprise, in series: a first sub-region (208-1) which extends from the second cylindrical region (226), and the first sub-region (208-1) increases in diameter along at least part of its length; a second sub-region (208-2) of constant diameter; and a third sub-region (208-3) which increases in diameter along its length to the socket (210, 1210).

The concave bearing surface (120) of the first bearing coupling (106) may have a first radius (R1). The convex bearing surface (220) of the second bearing coupling (206) may have a second radius (R2). The first radius (R1) may be greater than the second radius (R2).

A slideable handle (150) may be provided on the wheel carrying bar (100), operable to slide along the first wheel support region (108), and along the second wheel support region (208) to thereby push the wheel (12) towards the socket (210, 1210) along the wheel support region (208).

The socket (1210) may be configured to fit into a wheel hub fixing feature (42) provided as a threaded passage (50) for receiving a bolt (51).

The socket (1210) may comprise a male section (1252) compatible with the threaded passage (50) so that the male section (1252) is operable to be slid into the threaded passage (50).

The socket (210) may be configured to fit onto a wheel hub fixing feature (42) provided as a threaded stud bolt (60) for receiving a nut (62).

The socket (210) may comprise a female sleeve (264) compatible with the threaded stud bolt (60) so that the socket (210) is operable to be slid onto the threaded stud bolt (60).

There may also be provided a method of fitting a wheel (12) to a wheel hub (40) of a vehicle (14) using a tool set (10). The method comprising the steps of: (a.) engaging the socket (210, 1210) of the support peg (200, 1200) with a fixing feature (42) of the wheel hub (40); (b.) extending the wheel carrying bar (100) through a fixing feature aperture (80) on the wheel (12) so that the wheel (12) is carried on the first wheel support region (108) of the wheel carrying bar (100); (c.) engaging the first bearing coupling (106) of the wheel carrying bar (100) with the second bearing coupling (206) of the support peg (200, 1200); (d.) pivoting the wheel carrying bar (100) relative to the support peg (200, 1200) to lift the wheel (12); (e.) moving the wheel (12) along the first wheel support region (108) of the wheel carrying bar (100) to the second end (104) of the wheel carrying bar (100), across the pivotable joint (140) and along the second wheel support region (208) of the support peg (200, 1200) towards the socket (210, 1210); (f.) locating the wheel (12) in place on the wheel hub (40); (g.) disconnecting the wheel carrying bar (100) from the support peg (200, 1200); (h.) fixing the wheel (12) in place on the wheel hub (40) with a wheel fixing feature (51, 62) compatible with a further fixing feature (42) of the wheel hub (40); (i.) disengaging the socket (210, 1210) of the support peg (200, 1200) from the fixing feature (42) of the wheel hub (40).

The method may comprise the step of before moving the wheel (12) across the pivotable joint (140) and along the second wheel support region (208) of the support peg (200, 1200) towards the socket (210, 1210), the first coupling axis (128) and second coupling axis (228) are aligned.

The method may comprise the step of moving the wheel (12) along the first wheel support region (108) comprises bringing the slideable handle (150) into contact with the wheel (12) and pushing the handle (150) along the first wheel support region (108), across the pivotable joint (140) and along the second wheel support region (208) to thereby push the wheel (12) towards the socket (210, 1210).

There may also be provided a tool kit (90) comprising a tool set (10) according to the present disclosure and further comprising instructions defining the method according to the present disclosure.

There may also be provided a vehicle (14) comprising a tool kit (90) according to the present disclosure.

Hence there is provided a tool, tool set, a tool kit, a vehicle comprising a tool kit and/or tool set of the present disclosure, a method of fitting a wheel to a wheel hub and a tool kit which comprises instructions for fitting a wheel to a wheel hub according to the present disclosure.

These are advantageous as they substantially reduce the amount of physical effort required by a user when fitting a wheel to a wheel hub of a vehicle, and also enable a user to exert force in a more efficient and comfortable manner without over-straining their back, and reducing their contact with the wheel and/or tyre.

The tool set may be easily stored in a tool kit. The tool set may be easily stored within a vehicle. Additionally, the tool set is extremely simple to use and understand such that even an inexperienced user can fit a wheel to a vehicle using the tool set of the present disclosure.

BRIEF DESCRIPTION OF THE DRAWINGS

Examples of the present disclosure will now be described with reference to the accompanying drawings, in which:

FIG. 1 shows a vehicle comprising a tool set and kit of the present disclosure;

FIG. 2 shows a wheel carrying bar according to the present disclosure;

FIG. 3 shows a sectional view of the wheel carrying bar shown in FIG. 2;

FIG. 4 shows a first example of a support peg according to the present disclosure;

FIG. 5 shows a second example of a support peg according to the present disclosure;

DETAILED DESCRIPTION

Figures 6, 7:
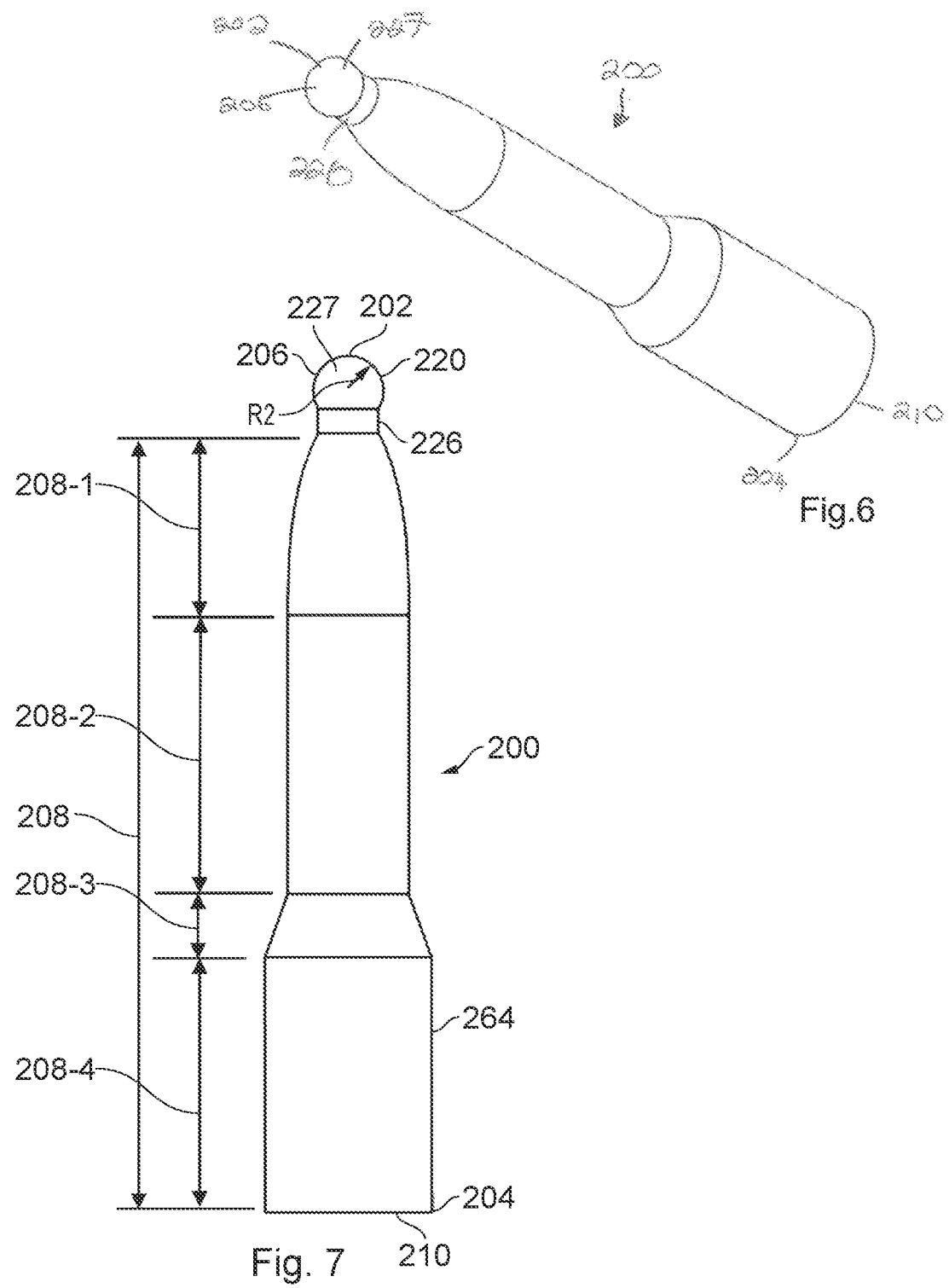
FIGS. 6, 7 shows enlarged views of the first example of the support peg as shown in FIG. 4.
Figure 8:
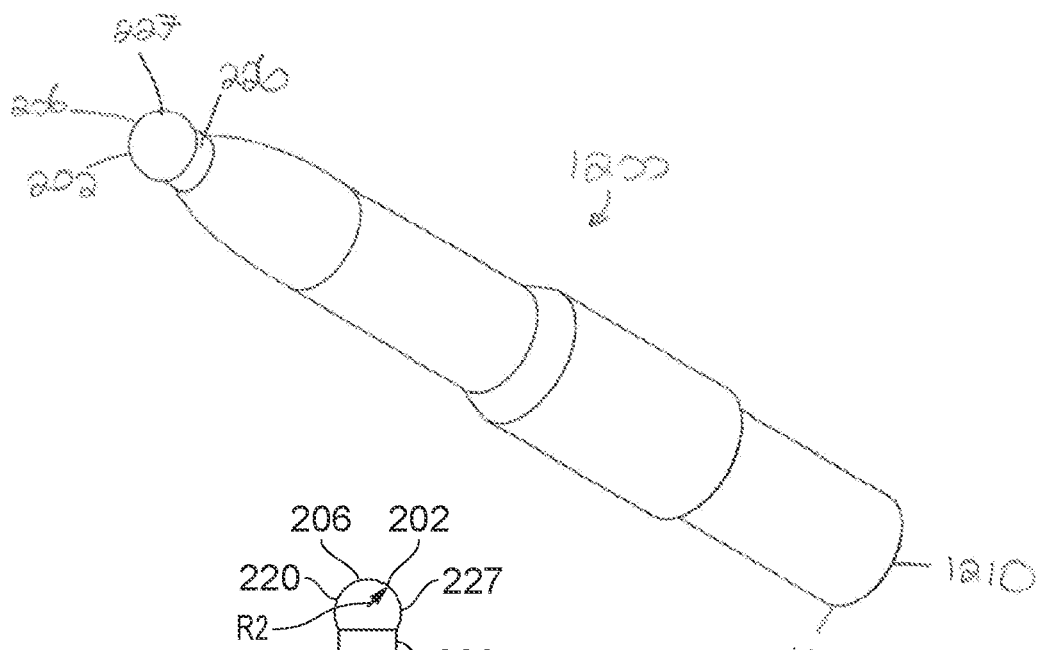
FIGS. 8, 9 shows enlarged views of the second example of the support peg as shown in FIG. 5.
Figure 9:
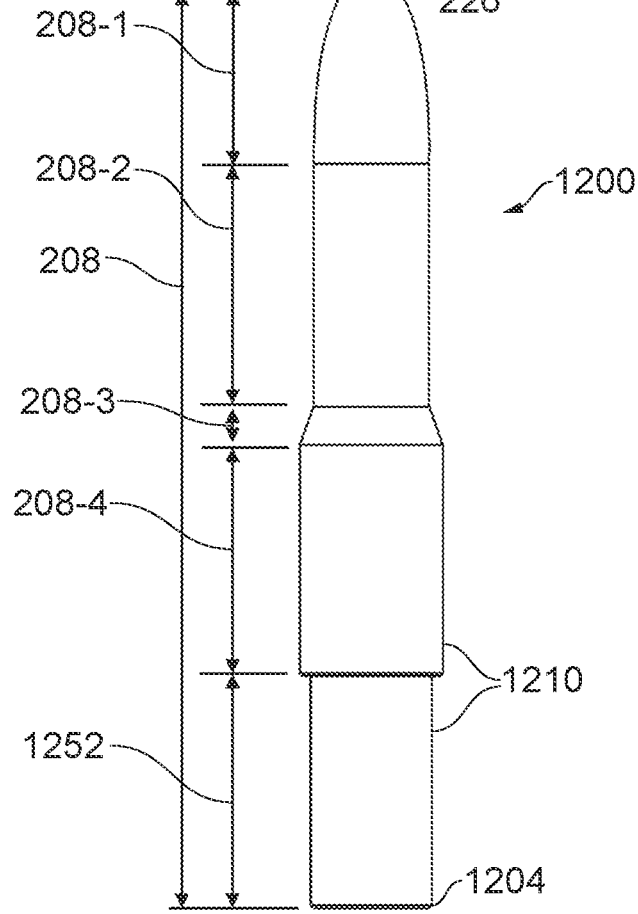

FIG. 1 illustrates an example of a vehicle having a wheel hub 40 comprising fixing features 42 for fixing a wheel 12 of the vehicle 14 to the wheel hub 40. The wheel fixing features 42 may be threaded passages 50 or threaded stud bolts 60. In FIG. 1, the wheel hub 40 is hidden behind the framework of the wheel 12. The vehicle comprises bodywork 106 located above the wheel hub 40, for example defining a wing 107 which defines a wheel arch in which the car wheel 12 is housed and/or recessed.

The vehicle 14 may comprise a tool set 10 according to the present disclosure. In FIG. 1, the tool set 10 is shown provided in a storage compartment of the vehicle 14. The tool set 10 may form part of a tool kit 90, which may also be stored in the storage compartment of the vehicle 14. The tool kit 90 may comprise instructions defining the method of use of the tool set 10, and hence defines the method of fitting a wheel to a wheel hub of a vehicle using apparatus according to the present disclosure.

Features of the tool set, some of which are optional, are shown in FIGS. 2 to 13, and how they may be used are shown in FIGS. 14 to 29. The tool set 10, configured for fitting a wheel 12 to the wheel hub 40 of the vehicle 14, comprises a wheel carrying bar 100. A side view of the wheel carrying bar 100 is shown in FIG. 2. A sectional view of the wheel carrying bar 100 is shown in FIG. 3. The tool set 10 further comprises a support peg 200, 1200. A first example of the support peg 200 is shown in FIGS. 4, 6, 7, 10. A second example of the support peg 1200 is shown in FIGS. 5, 8, 9, 11. That is to say, a tool of the present disclosure, configured for fitting a wheel 12 to the wheel hub 40 of the vehicle 14, may be provided as a kit of parts comprising a wheel carrying bar 100 and one or more support pegs 200, 1200. The kit of parts may comprise one or more of the first example and second example of support pegs 200, 1200 shown. Each of the first example and second example of support pegs shown may be provided in different sizes. Hence a plurality of support pegs 200, 1200 may be provided as part of the kit of parts (i.e. tool kit), with several support pegs 200 of different sizes of the first example, and several support pegs 1200 of different sizes of the second example. Common features of the first and second example of the support pegs 200, 1200 are referred to with the same reference numeral.

The wheel carrying bar 100 comprises a first end 102 and a second end 104. In the example shown in the figures, the wheel carrying bar 100 is straight. The wheel carrying bar 100 comprises a first wheel support region 108 which extends away from the first end 102 to a first bearing coupling 106 provided at the second end 104. In use, the first end 102 is a free end. The wheel carrying bar 100 may comprise a handle 112 provided towards the first end 102, the handle 112 configured for receiving a force input from a user. The handle 112 may be fixed to the wheel carrying bar 100 so it is not moveable relative to the wheel carrying bar 100.

Thus the first bearing coupling 106, wheel support region 108 and handle 112 are arranged in series along the length of the wheel carrying bar 100.

Each type of support peg 200, 1200 comprises a third end 202, 1202 and fourth end 204, 1204, a second bearing coupling 206 being provided at the third end 202, 1202, and a second wheel support region 208 extends away from the second bearing coupling 206 towards a socket 210, 1210 provided at the fourth end 204, 1204.

The socket 210, 1210 of each example of support peg 200, 1200 is configured to be engaged with or located in/on one of the hub fixing features 42.

As will be shown, the socket 210 of the first example of support peg 200 (shown in FIGS. 4, 6, 7, 10) is configured to be engaged with or located on one of the hub fixing features 42 (for example provided as a threaded stud bolt 60), and the socket 1210 of the second example of support peg 200 (shown in FIGS. 5, 8, 9, 11) is configured to be engaged with or located in one of the hub fixing features 42 (for example provided as a threaded passage 50).

The first bearing coupling 106 is configured to pivotably engage with the second bearing coupling 206. That is to say, the first bearing coupling 106 is configured to form a pivotable joint 140 with the second bearing coupling 206.

As shown in FIGS. 16 to 22, a slideable handle 150 may be provided on the wheel carrying bar 100. The slideable handle 150 may be operable to slide along the first wheel support region 108, and along the second wheel support region 208 and to engage with (i.e. abut) a wheel 12 to push it towards, and onto, the socket 210, 1210. The slideable handle 150 may comprise an abutment at one end, configured for abutting the wheel 12, and spacing the wheel 12 apart from a users hand located on the slideable handle. The abutment 150 may take the form of a guard which extends radially outwards away from the body of the slideable handle 150.

Figure 12:
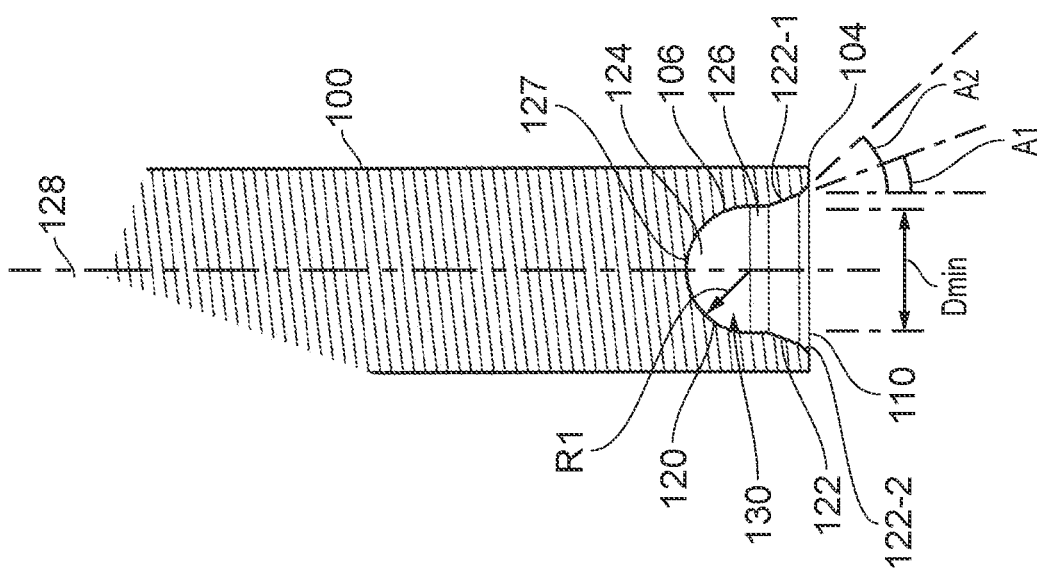
FIG. 12 shows enlarged view of the end of the wheel carrying bar as shown in FIGS. 10, 11.

As shown in FIG. 12, the first bearing coupling 106 of the wheel carrying bar 100 may comprise an opening 110 at the second end 104 from which extends a concave bearing surface 120 which defines a cavity 130 (for example, a female socket) centred and/or extending along on a first coupling axis 128.

Figure 10:
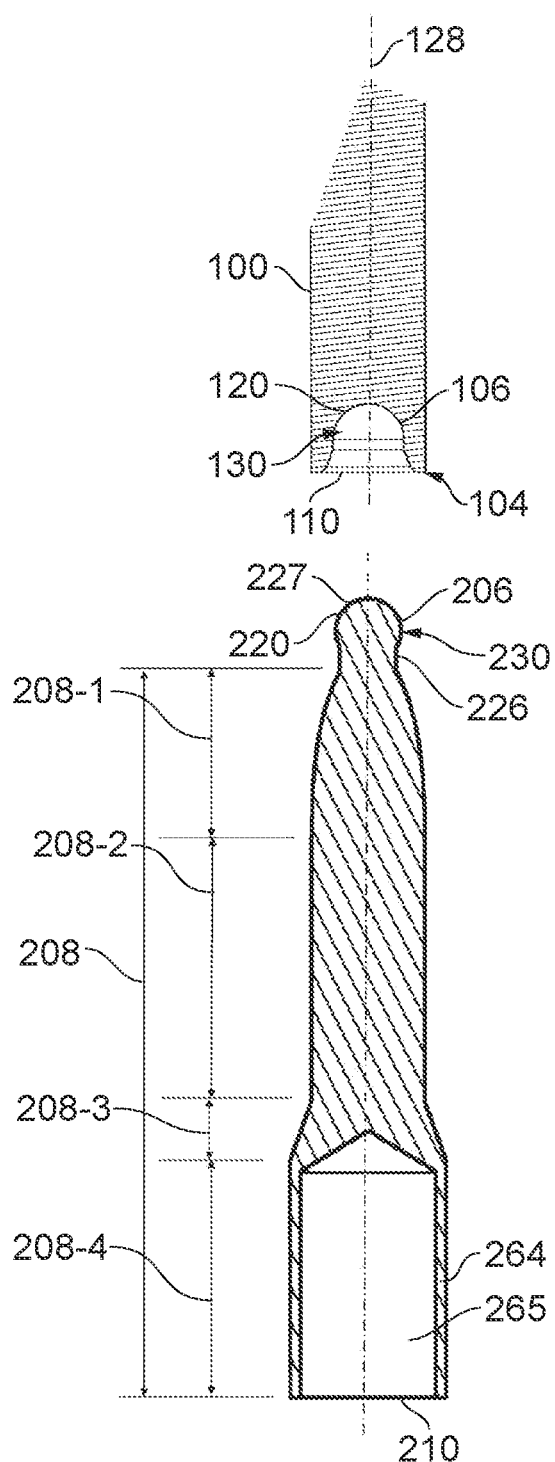
FIG. 10 shows enlarged view of the support peg of FIGS. 4, 6, 7 lined up with an end of the wheel carrying bar.
Figure 11:
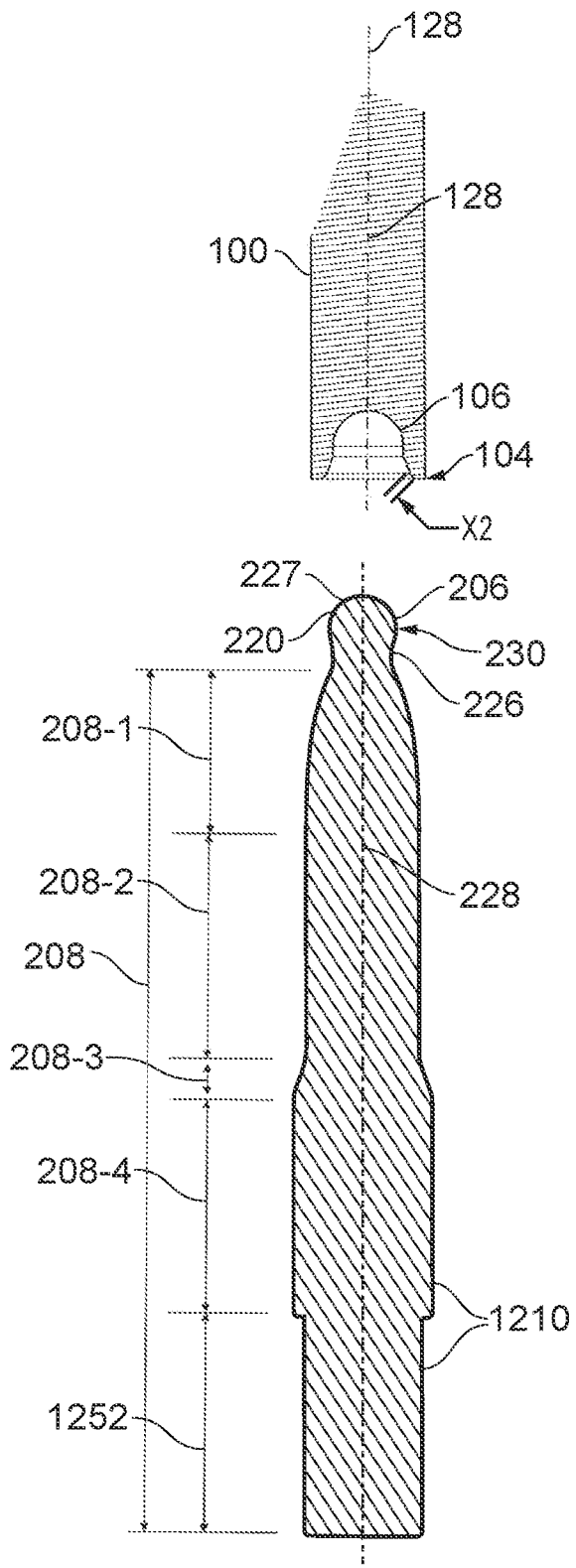
FIG. 11 shows an enlarged view of the support peg of FIGS. 6, 8, 9 lined up with an end of the wheel carrying bar.

As shown in FIGS. 10, 11, the second bearing coupling 206 of the support peg 200, 1200 defines a convex bearing surface 220 which defines a male engagement member 230 (for example a ball shape) which extends from the third end 202, 1202 and is centred on and/or extends along a second coupling axis 228. That is to say, the second bearing coupling 206 at the third end 202, 1202 comprises a male engagement member 230 with a convex bearing surface 220 which is centred on the second coupling axis 228.

The first coupling axis 128 extends along length of wheel carrying bar 100. That is to say, in the examples shown, the wheel carrying bar 100 is substantially straight, and extends along (i.e. is co-axial and/or concentric with) the first coupling axis 128.

The second coupling axis 228 extends along length of support peg 200, 1200. That is to say, in the examples shown, the support peg 200, 1200 is substantially straight, and extends along (i.e. is co-axial and/or concentric with) the second coupling axis 228.

The wheel carrying bar 100 and support peg 200, 1200 may both have circular cross-sections along their length, and have the same diameter as one another at least along some of their length.

The first bearing coupling 106 is configured to receive the second bearing coupling 206, and the couplings 106, 206 are slidable relative to one another so that they may pivot relative to one another to form the pivotable joint 140.

The first bearing coupling 106 and the second bearing coupling 206 are configured to form a floating joint while pivotably engaged. That is to say, the second bearing coupling 206 is freely located in the first bearing coupling 106. Put another way, the second bearing coupling 206 is not fixed in the first bearing coupling 106, rather it is loose fitting.

As shown in FIG. 12, extending inwards from the opening 110, the concave bearing surface 120 of the first bearing coupling 106 has a convergent lead-in region 122 which reduces in diameter from the opening 110 to a minimum diameter Dmin, from which extends a support region 124 comprising a spherical surface 127 (e.g. a bearing socket).

A first cylindrical region 126 of the same diameter as the minimum diameter Dmin extends between the convergent lead-in region 122 and the spherical surface 127. That is to say, the first cylindrical region 126 has the same diameter as the minimum diameter Dmin, and spaces apart the convergent lead-in region 122 and the spherical surface 127.

The convergent lead-in region 122 comprises a first frustoconical region 122-1 having a length X1 along its surface having a first angle of inclination A1 relative to the first coupling axis 128. That is to say, the convergent lead-in region 122 comprises a first frustoconical region 122-1 extending a length X1 at a first angle of inclination A1 relative to the first coupling axis 128.

The convergent lead-in region 122 comprises a second frustoconical region 122-2 having a length X2 along its surface having a second angle of inclination A2 relative to the first coupling axis 128. That is to say, the convergent lead-in region 122 comprises a second frustoconical region 122-2 extending a length X2 at a second angle of inclination A2 relative to the first coupling axis 128.

The second frustoconical region 122-2 extends from the first frustoconical region 122-1, the first frustoconical region 122-1 being spaced apart from the opening 110 by the second frustoconical region 122-2. The first angle of inclination A1 is less than the second angle of inclination A2.

The first angle of inclination A1 may be in the range of 10 to 30 degrees The first angle of inclination A1 may be in the range of 15 to 25 degrees. The first angle of inclination A1 may be about 20 degrees.

The second angle of inclination A2 may be in the range of 35 to 50 degrees. The second angle of inclination A2 may be in the range of 40 to 50 degrees. The second angle of inclination A2 may be about 45 degrees.

As shown in FIGS. 10, 11, the convex bearing surface 220 of the second bearing coupling 206 is provided as a spherical surface 227 which extends from the third end 202, 1202 of the support peg 200, 1200 towards the fourth end 204, 1204. A second cylindrical region 226 of constant diameter extends from the convex bearing surface 220 a length X3 some, but not all, of the way to the socket 210, 1210. That is to say, the second cylindrical region 226 of constant diameter spaces apart the convex bearing surface 220 from the rest of the support peg 200, 1200.

Put another way, the convex bearing surface 220 of the second bearing coupling 206 is provided as a spherical surface 227. The second cylindrical region 226, centred on the second coupling axis 228, extends the length X3 from the convex bearing surface 220 along the second coupling axis 228 some of the way towards the socket 210, 1210. The convex bearing surface 220, the second cylindrical region 226 and socket 210, 1204 are provided in series along the second coupling axis 228.

The length X1 is substantially the same as the length X3. That is to say the length X1 of the first frustoconical region 122-1 of the first bearing coupling 106 is substantially the same as the length X3 of the second cylindrical region 226 of the second bearing coupling 206.

As indicated in FIGS. 7, 9, 10, 11, the second wheel support region 208 comprises, in series a first sub-region 208-1, a second sub-region 208-2 and a third sub-region 208-3.

The first sub-region 208-1 increases in diameter from the second cylindrical region 226 along part of its length. The first sub-region 208-1 may be concave along its length. The first sub-region 208-1 extends from the second cylindrical region 226. The second sub-region 208-2 is of constant diameter. The third sub-region 208-3 increases in diameter along its length to the socket 210, 1210 and may be frustoconical. Hence a diameter of the socket 210, 1210 region (indicated with ref 208-4) is greater than the second sub-region 208-2.

The concave bearing surface 120 of the first bearing coupling 106 has a first radius R1. The convex bearing surface 220 of the second bearing coupling 206 has a second radius R2, and the first radius R1 is greater than the second radius R2. The first radius may be in the range of 3% to 11% greater than the second radius R2. The first radius R1 may be about 7% greater than the second radius R2.

Figure 13:
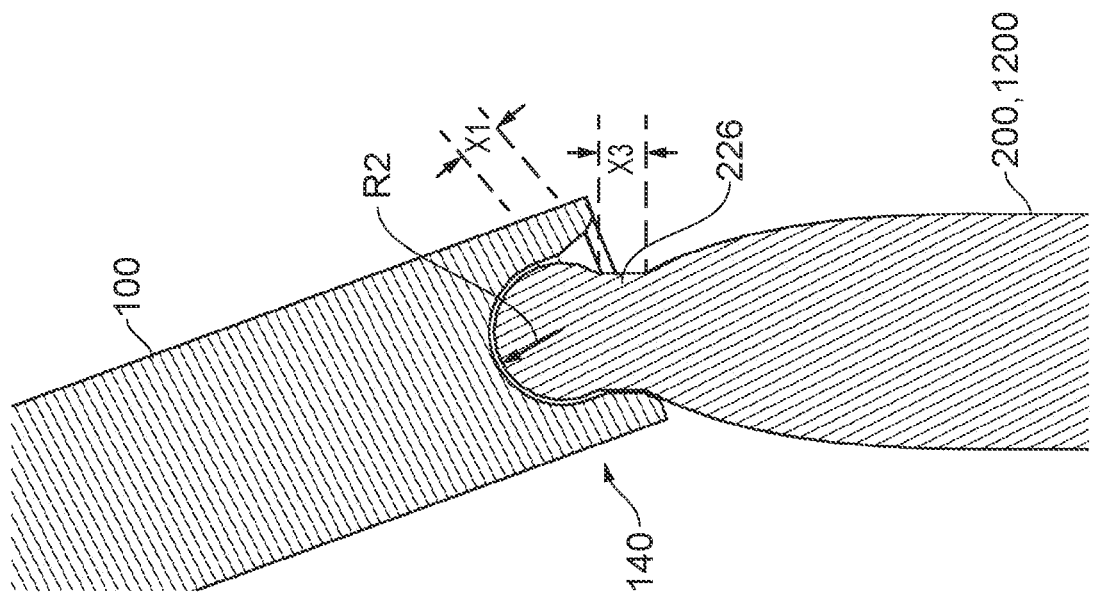
FIG. 13 shows an enlarged view of the support peg examples engaged with the wheel carrying bar.

The value of radius R1, radius R2, length X1, length X3 are chosen such, as shown in FIG. 13, when the second bearing coupling 206 is engaged with the first bearing coupling 106, and the wheel carrying bar 100 is at an angle to the support peg 200, 1200 then the first frustoconical region 122-1 is located on the second cylindrical region 226. The first frustoconical region 122-1 is also sized to ensure that the second bearing coupling 206 is seated in the first bearing coupling 106 until a predetermined angle between the axes 128, 228 of the wheel carrying bar 100 and support peg 200, 1200 is reached.

By way of non limiting example:
the wheel carrying bar having may have a diameter of about 10 mm;
the first radius R1 may be about 3.1 mm;
the second radius R2 may be about 2.9 mm;
the length X1 and length X3 may be about 2 mm;
opening 110 may have a diameter of about 8.3 mm;
the first frustoconical region 122-1 may increase in diameter from 6.2 mm to 7.3 mm;
the second frustoconical region 122-1 may increase in diameter from 7.3 mm to 8.3 mm; and/or
the first cylindrical region 126 may extend about 0.9 mm along the first coupling axis 128 and have a diameter of about 6.2 mm.

In alternative non-limiting examples the dimensions may be different to that set out in the preceding paragraph. In further alternative non-limiting examples the dimensions may be different to that set out in the preceding paragraph, but may be provided in the same ratio to one another as set out in the preceding paragraph.

Figure 28:
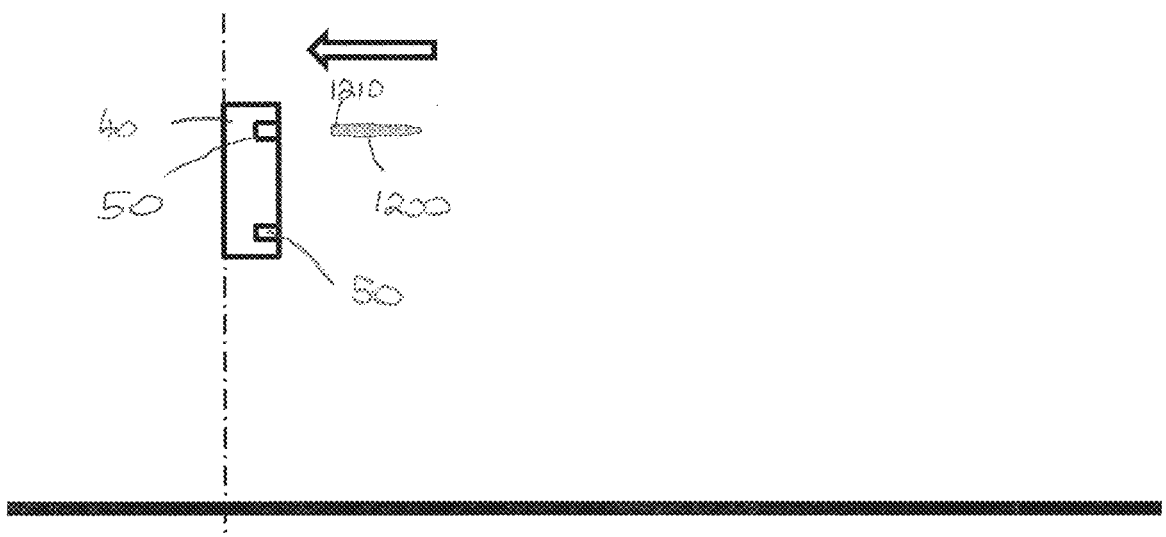
FIGS. 28, 29 illustrate how the second example of the support peg may be installed as an alternative to the first example of the support peg.
Figure 29:
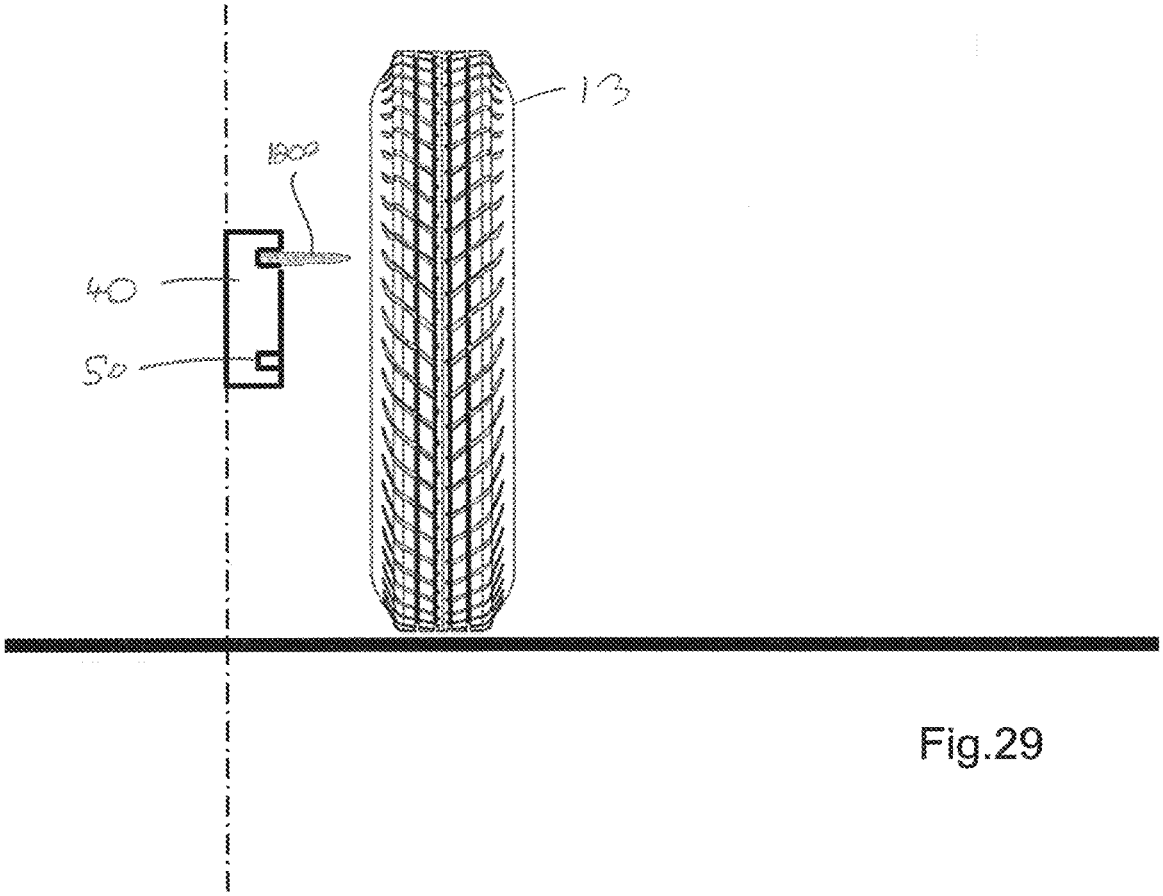

The socket 1210 of the example of FIGS. 5, 8, 9, 11 is configured to fit into a wheel hub fixing feature 42 provided as a threaded passage 50 for receiving a bolt 51. That is to say, the socket 1210 of the wheel carrying bar 100 is shaped and has dimensions such that it may fit into a threaded wheel hub fixing feature 42, provided as a threaded passage 50, which is configured to receive a bolt 51 for tightening the wheel 12 against the wheel hub 40 of the vehicle 14. This arrangement is shown in FIGS. 28, 29. The socket 1210 may comprise an unthreaded (for example plain or smooth) male section 1252, having smaller diameter than the wheel support region 208-4 of the socket 1210) compatible with the threaded passage 50 so that the socket 1210 may be slid into the threaded passage 50. That is to say, the socket 1210 of the wheel carrying bar 100 may be provided as an unthreaded male section 1252 which is small enough to fit within the threaded passage 50 in the wheel hub 40.

Alternatively, the socket 1210 of FIGS. 5, 8, 9, 10 may comprise a male threaded section compatible with the threaded passage 50 so that the hub engagement end may be screwed into the threaded passage 50. That is to say, the socket 1210 of the wheel carrying bar 100 may be of the same diameter and threaded with the same pitch as the bolt 51 used to fix the wheel 12 to the wheel hub 40.

Support pegs 1200 may be provided with the socket 1200 having a suitable external diameter, which by way of non limiting example may be about 12 mm or 14 mm.

Alternatively, the socket 210 of the first example (shown in FIG. 4, 6, 7, 10) may be configured to fit onto a wheel hub fixing feature 42 provided as a threaded stud bolt 60 for receiving a nut 62. This arrangement is shown in FIGS. 14 to 27. That is to say, the socket 210 will be configured to fit onto a threaded stud bolt 60 which extends out of the wheel hub 40, which is configured for extending through fixing apertures 80 provided on the wheel 12, so that when a nut 62 is attached to the end of the stud 60, the wheel 12 can be tightened onto the wheel hub 40.

Figure 14:
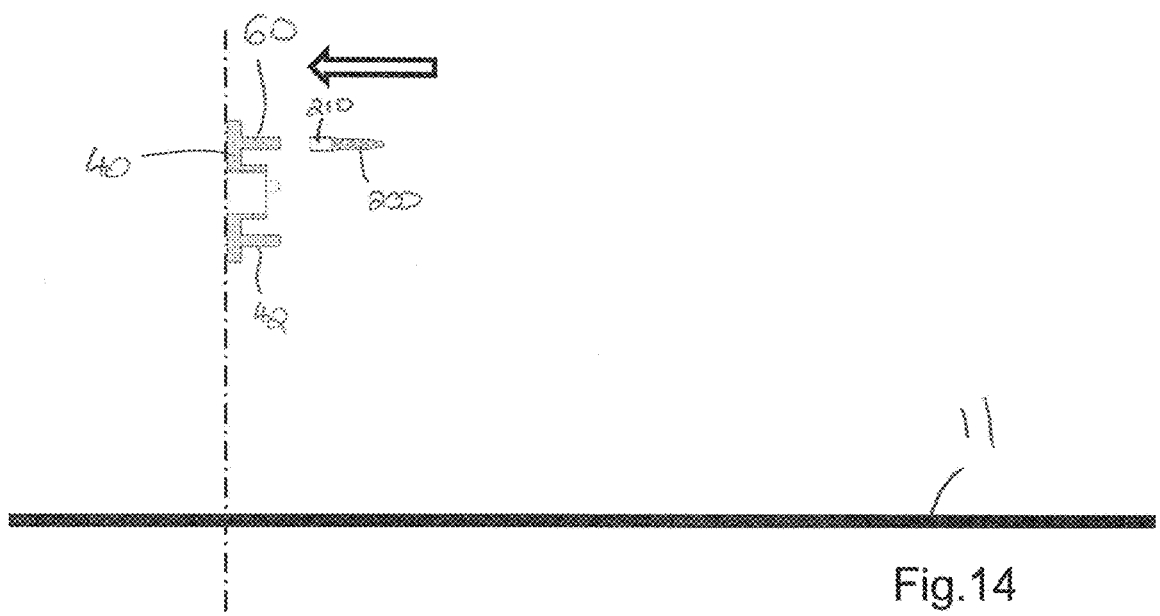
FIGS. 14 to 22 show different steps in the process of using tools of the tool set, with respect to the first example of the support peg, according to the present disclosure to fit a wheel to a vehicle.

The socket 210 may comprise a female sleeve 264, as shown in FIG. 10, compatible with the threaded stud bolt 60, so that the socket 210 of the wheel carrying bar 100 may be slid onto the threaded stud bolt 60, as shown in FIG. 14. The female sleeve 264 may be fixedly attached to, or integrally formed with, the support peg 200. The external surface of the female sleeve 264 may define the fourth sub-region 208-4 of the second wheel support region 208. Hence the sleeve 264 defines a cavity 265, as shown in FIG. 10, which will receive a stud bolt 60. The sleeve 264 has a small wall thickness to allow apertures 80 in a wheel to pass over the sleeve 264 (i.e. over the fourth sub-region 208-4 of the second wheel support region 208).

The socket 210 may comprise a female threaded section compatible with the threaded stud bolt 60 so that the socket 210 may be screwed onto the threaded stud bolt 60. That is to say, the socket 210 of the wheel carrying bar 100 may comprise a female threaded section which is configured to screw onto a threaded stud bolt 60 which extends from the hub 40 of the vehicle 14 (as shown in FIG. 14).

A stud bolt may be provided to fit inside the sleeve 264, and thus to extend out of the sleeve 264, to provide an unthreaded male section or a male threaded section.

Support pegs 200 may be provided with the cavity 265 having a suitable internal diameter, which by way of non limiting example may be about 12 mm or 14 mm.

The socket 210, 1210 may comprise a plastic coating, end cap or sleeve. The coating, end cap or sleeve may comprise polyurethane. This has the advantage that the socket 210, 1210 which interfaces with features of the hub 40 is made of a material that will not damage the features of the hub 40 (for example threaded portions). Also the plastic may provide additional grip to help maintain the socket 200 in engagement with features of the hub 40 (for example the passage 50 or bolt 60).

A method of fitting a wheel to a wheel hub of a vehicle using the apparatus of the present disclosure is illustrated in FIGS. 14 to 27. FIGS. 14 to 27 illustrate the use of the wheel carrying bar 100 and the first example of support peg 200 shown in FIGS. 4, 6, 7, 10 although it will be appreciated that the second example of support peg 1200 (as shown in FIGS. 5, 8, 9, 11) may be used instead of the first example of support peg 100, depending on the type of wheel hub. FIGS. 28, 29 show the alternative steps for the second example of support peg 1200, akin to that shown in FIGS. 14, 15.

In FIGS. 14 to 29 the hub 40 the vehicle 14 is shown relative to a substrate 11 (i.e. the ground) on which the car is supported. For clarity, the rest of the vehicle 14 is not shown. The wheel 12 is illustrated with a metal inner section (i.e. the wheel) and a tyre 13 which surrounds the metal wheel 12. Both the hub 40 and wheel 12 and tyre 13 are of a conventional kind, and are illustrated in the figures by way of example only, the designs of which may of course vary in practice. Hence the arrangement shown in FIG. 15 shows the wheel 12 sat on the ground 11 next to the hub 40 of the car/vehicle 14, and to one side of and below the level of the hub 40.

Appropriate to the type of hub 40, the socket 210 of the support peg 200 (as shown in FIG. 14) or the socket 1210 of the support peg 1200 (as shown in FIG. 28) is engaged with the fixing feature 42 of the wheel hub 40. In the example shown in FIGS. 28, 29, the fixing feature 42 is provided as the threaded passage 50 and the socket 1210 either comprises an unthreaded male section or a threaded male section as described previously which extends within the passage 50.

Figure 15:
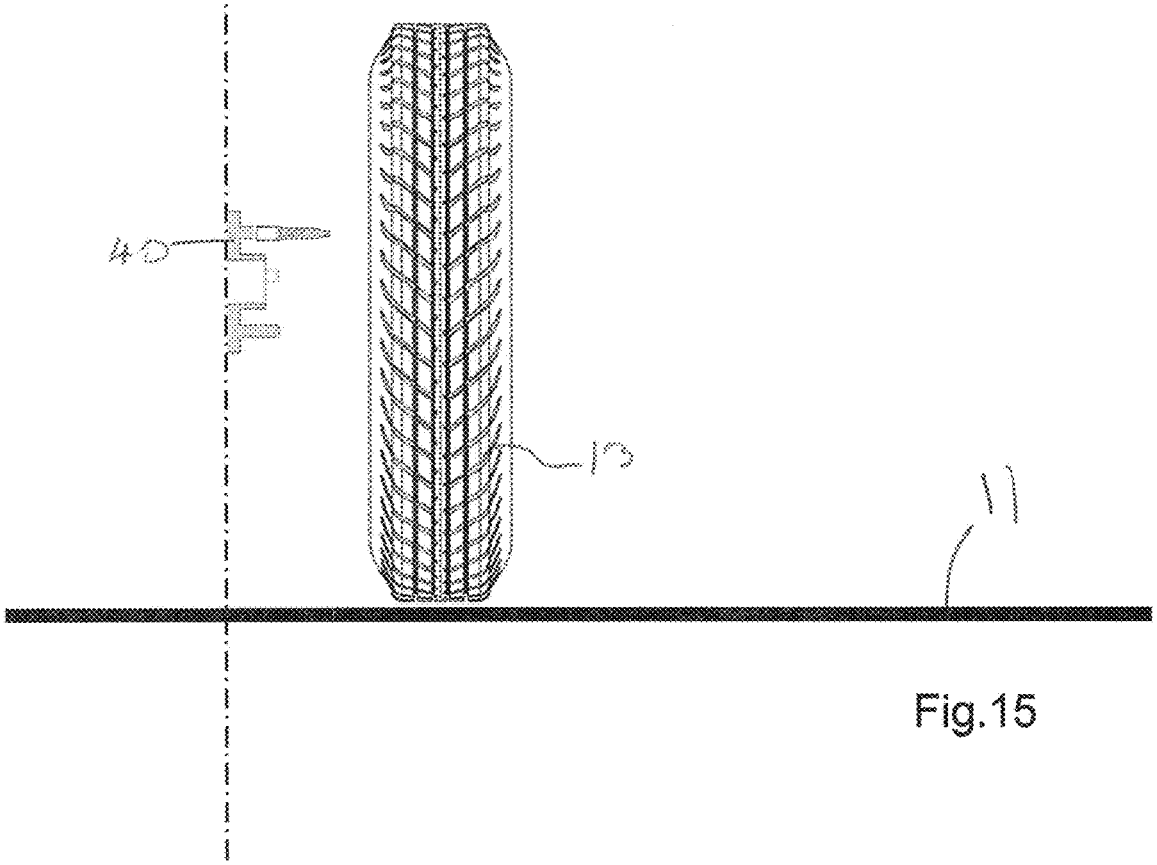

Alternatively, as shown in FIGS. 14, 15 the wheel hub fixing feature 42 may be provided as a threaded stud bolt 60 for receiving a nut 62, and the socket 210 comprises the female sleeve 264 which is compatible with the threaded stud bolt 60, allowing the socket 210 to slide, or screw, onto the threaded stud bolt 60. In all other respects, despite the differences of the socket types, the method of operation is the same for both.

Figure 16:
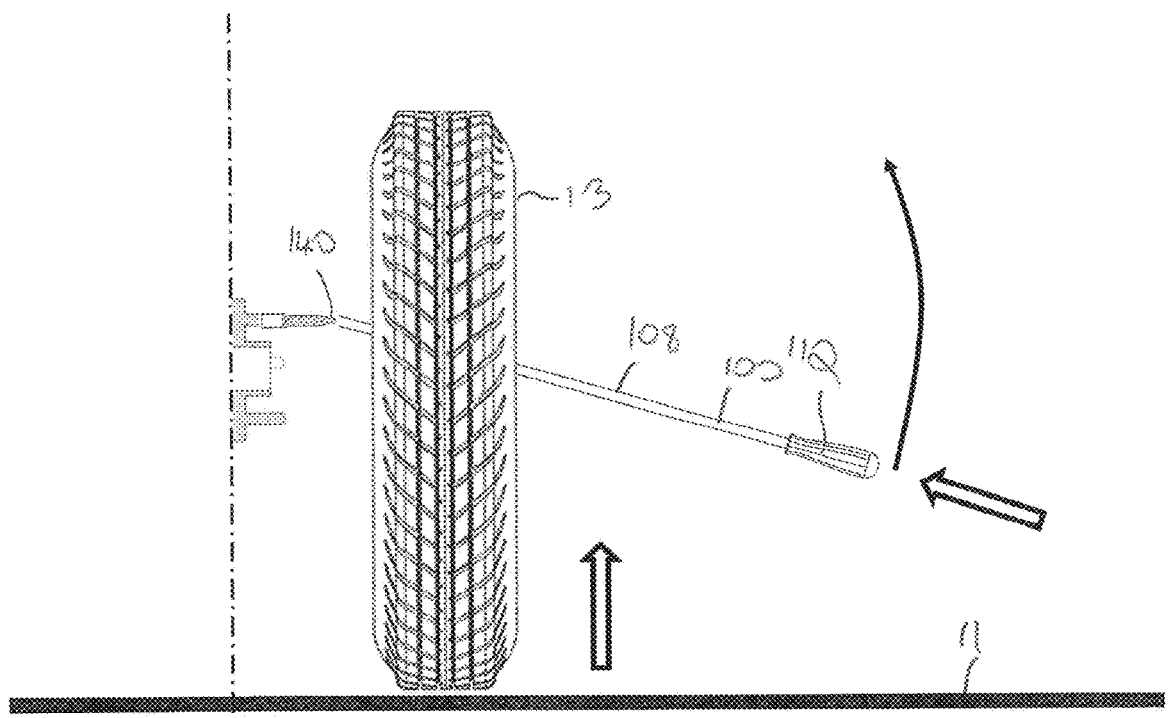

The wheel carrying bar 100 is extended by the user into (i.e. passed through) a fixing feature aperture 80 on the wheel 12 so that the wheel 12 may be carried on the first wheel support region 108 of the wheel carrying bar 100 as shown in FIG. 16. Put another way, the wheel carrying bar 100 is passed through the aperture 80 in the wheel which bolts (e.g. the stud bolts 60) will pass through in order to clamp the wheel 12 to the hub 40 when the bolt is inserted in the threaded passage 50.

From the orientation shown in FIG. 16, the wheel 12 and wheel carrying bar 100 may be moved relative to one another until the wheel 12 is at a convenient distance from the handle 112 on the first wheel support region 108. This may be any distance along the first wheel support region 108, as may suit the user.

Also as shown in FIG. 16, the first bearing coupling 106 of the wheel carrying bar 100 is then engaged with the second bearing coupling 206 of the support peg 200, 1200. That is to say, the second bearing coupling 206 is then entered in the first bearing coupling 106 (for example, as shown in FIG. 13).

Figure 17:
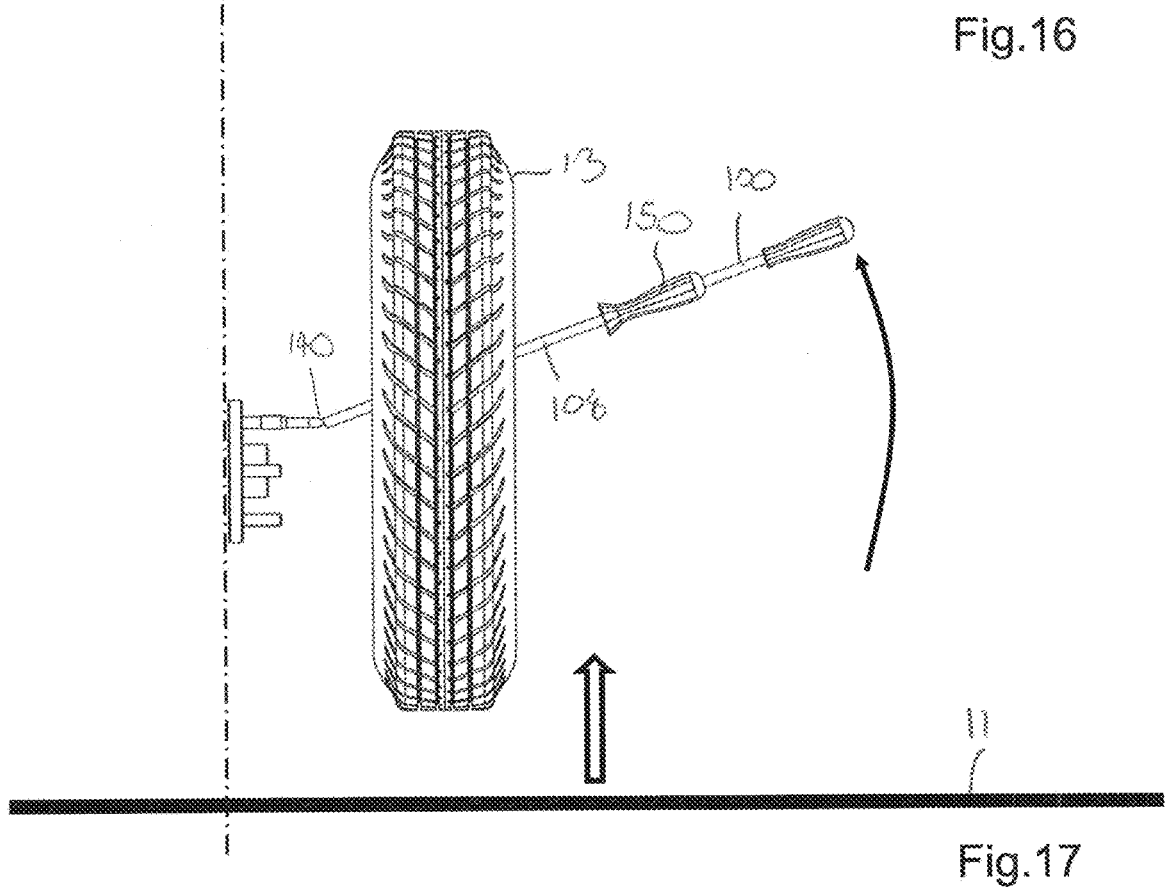
Figure 18:
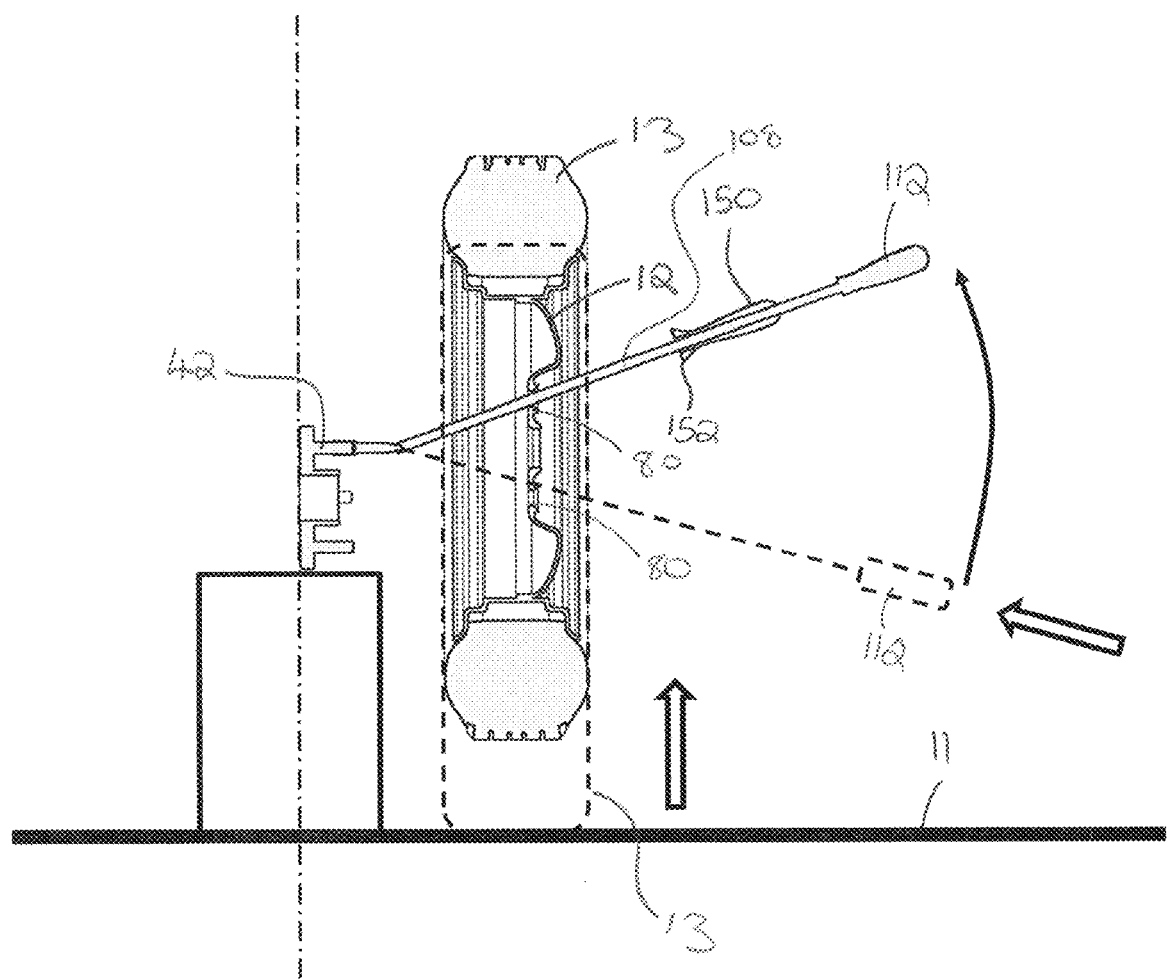

As shown in FIGS. 17, 18, the wheel carrying bar 100 is then pivoted upwards, away from the ground 11. In FIG. 18, a dotted line indicates the position of the tyre 13 when on the ground (for example in FIG. 17). Since the socket 210, 1210 is engaged with the hub fixing feature 42 (and hence the hub 40), and the first bearing coupling 106 of the wheel carrying bar 100 is engaged with the second bearing coupling 206 of the support peg 200, 1200, when the handle 112 is lifted by the user, the wheel 12 is lifted free of the ground 11. Provided the wheel 12 is closer to the joint 140 than the handle 112, then lifting the wheel 12 will be relatively easy for the user as the wheel carrying bar 100 is acting as a lever.

Figure 19:
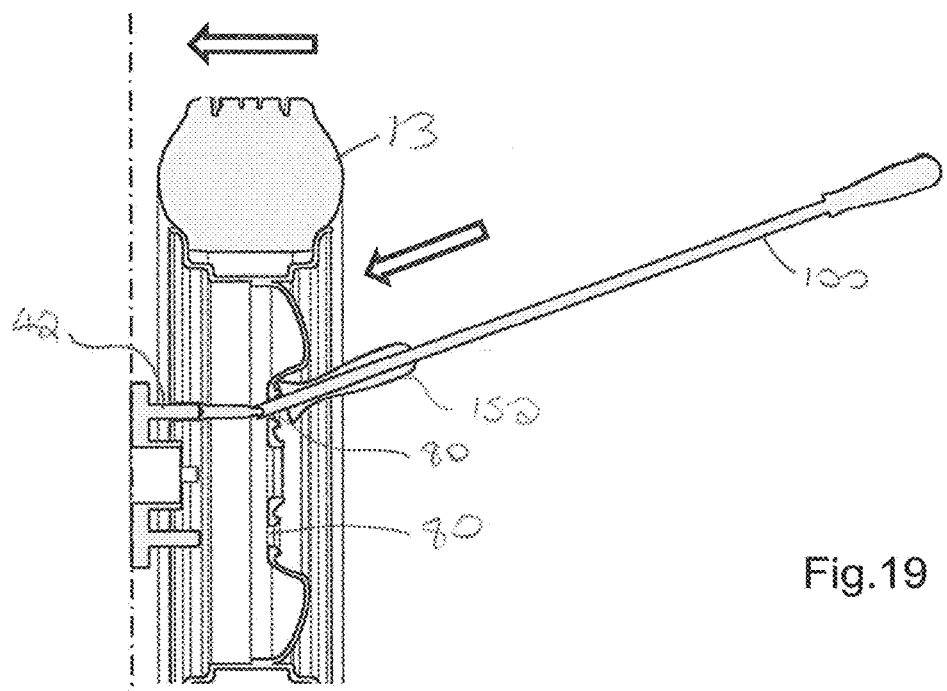
Figure 20:
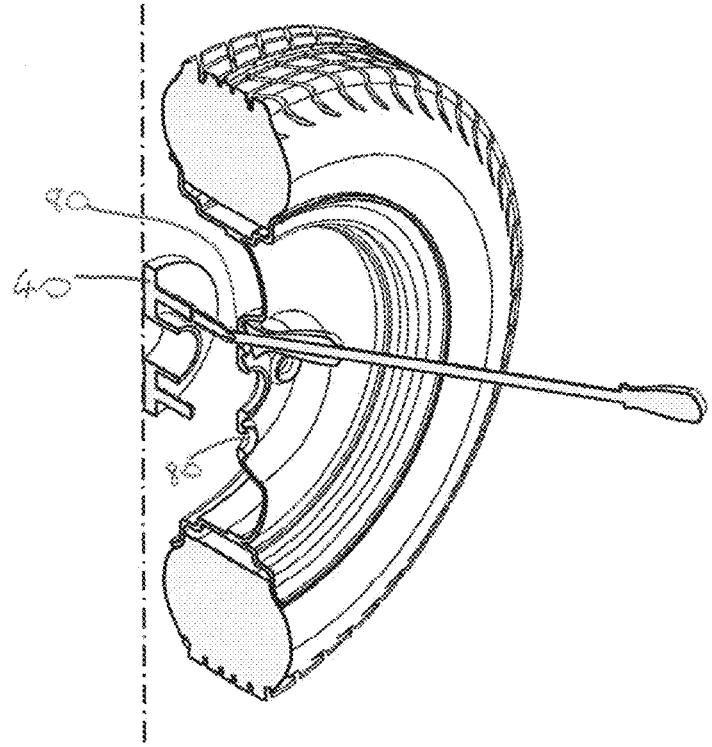

As shown in FIG. 19, when the handle 112, and thus when the wheel carrying bar 100, is at a suitable angle for handling of the wheel 12, the wheel may be moved, for example by sliding the wheel 12, in the direction indicated by arrows, along the first wheel support region 108 of the wheel carrying bar 100 to the second end 104 of the wheel carrying bar 100, to the pivotable joint 140 between the wheel carrying bar 100 and the support peg 200, 1200. If the handle 112 is higher than the hub 40, then the wheel may slide along the wheel carrying bar 100 under the influence of gravity.

In an example in which the slidable handle 152 is present on the wheel carrying bar 100, the step of moving (e.g. sliding) the wheel 12 along the first wheel support region 108 comprises bringing the abutment 152 of the handle 150 into contact with the wheel 12 and pushing handle 150 along the first wheel support region 108.

Figure 21:
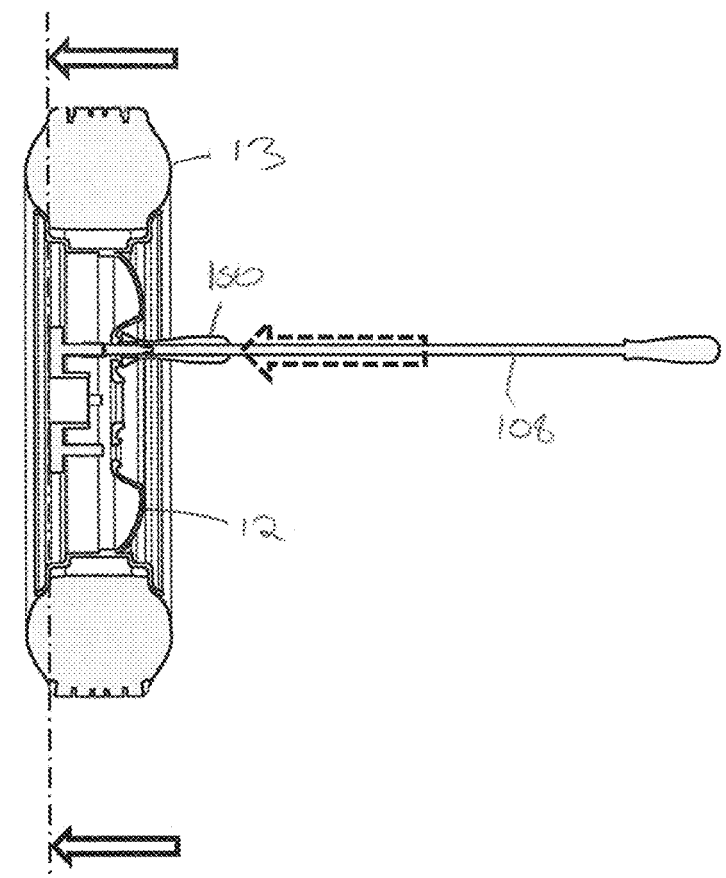
Figure 22:
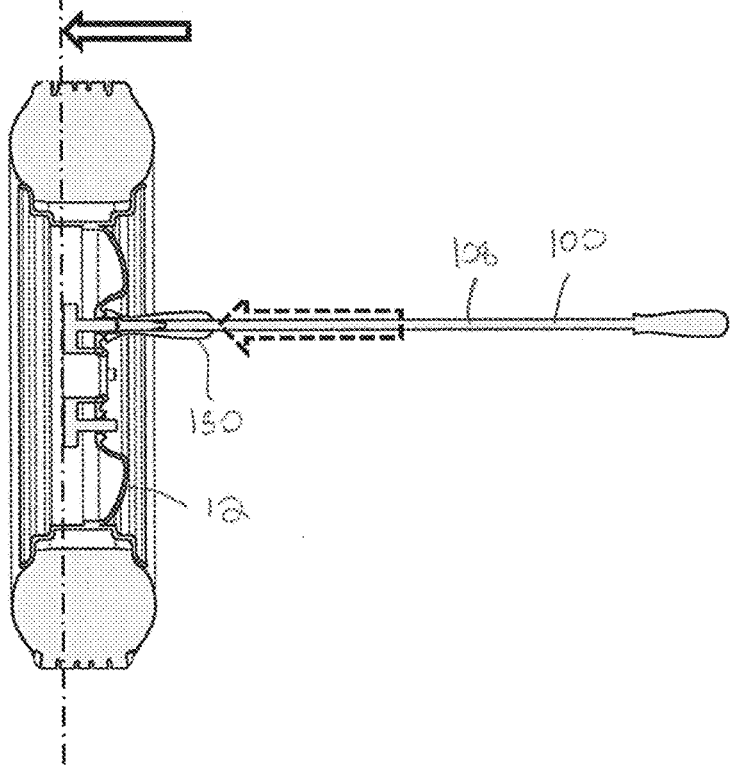
Figure 23:
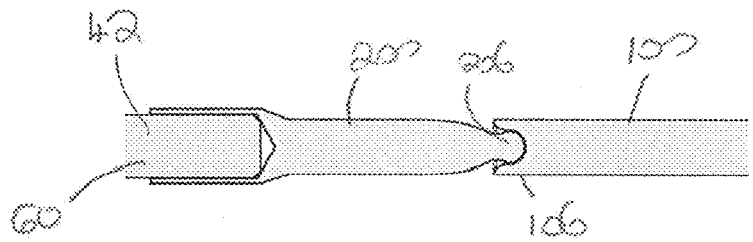
FIGS. 23 to 27 show enlarged views of the support peg engaged with the end of the support bar at various angles.
Figure 24:
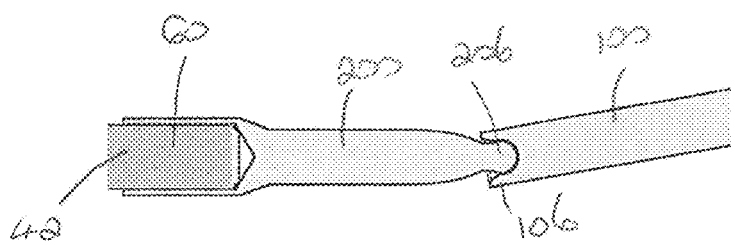
Figure 25:
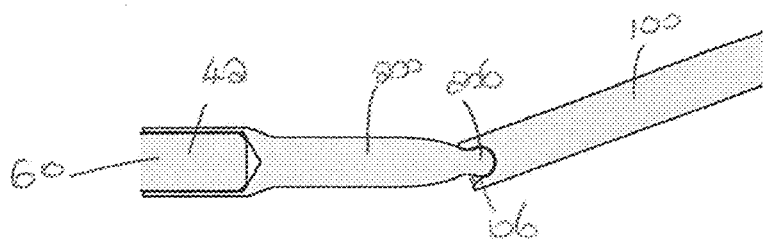
Figure 26:
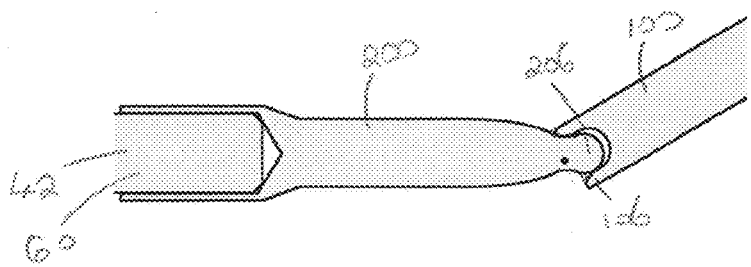

The method may comprise the step of before moving (for example sliding) the wheel 12 across the pivotable joint 140 and along the second wheel support region 208 of the support peg 200, 1200 towards the socket 210, 1210, the first coupling axis 128 and second coupling axis 228 are aligned, as shown in FIG. 21. That is to say, before moving (for example sliding) the wheel 12 across the pivotable joint 140 and along the second wheel support region 208 of the support peg 200, 1200 towards the socket 210, 1210, the wheel carrying bar 100 and support peg 200, 1200 are aligned so they lay on a common axis (e.g. perpendicular to the hub 40).

With the first coupling axis 128 and the second coupling axis 228 aligned, the wheel may be moved (for example pushed by the handle 112) across the pivotable joint 140 and along the second wheel support region 208 to thereby push/drive the wheel 12 towards the socket 210, 1210 in the direction shown by the arrows till it reaches the position shown in FIG. 19.

The wheel 12 may then be located in place on the wheel hub 40 by sliding the wheel 12 along to and onto the enlarged diameter region of the socket 210, 1210 (sub region 208-4), which is sized to have a diameter slightly smaller than the diameter of the fixing aperture 80, so the wheel can pass long the enlarged diameter 208-4 of the socket region 210, 1210, and so the fixing aperture is located in the correct position on the hub 40.

The wheel carrying bar 100 may then be disconnected from the support peg 200, 1200.

Wheel fixing features, which may be bolts 51 or nuts 62 depending on the example, may be used to clamp the wheel 12 to the wheel hub 40.

In the examples of FIGS. 14 to 27 nuts may be attached onto the ends of the studs 60 extending from the hub 40 in all of the locations except the one in which the support peg 200 is provided.

In the examples of FIGS. 28, 29, bolts 51 may be inserted through the apertures 80 of the wheel 12 and into the hub 40 in all of the locations except the one in which the support peg 1200 is provided.

Once at least some of the nuts/bolts are in place, the support peg 200 can be removed from the wheel hub fixing feature 42 of the wheel hub 40 and the wheel fixing feature aperture 80. That is to say, once at least some of the nuts/bolts are in place and holding the wheel 12 to the hub 40, the socket 210, 1210 of the support peg 200, 1200 can be disengaged from the fixing feature 42 of the wheel hub 40.

Then the remaining wheel fixing feature 51, 62 may be engaged in place of the support peg 200 in the last hub fixing feature location. The wheel fixing feature (i.e. bolt 51 and nuts 62 can then be tightened to the required torque in order for the wheel to be properly fixed to the hub 40.

The wheel carrying bar 100 and support pegs 200, 1200 may then be disassembled and stowed away as required.

Figure 27:
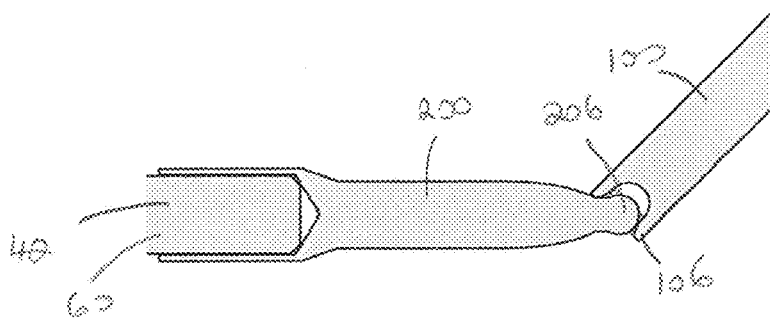

As shown in FIGS. 23 to 27, the lead in region of the first bearing coupling 106 supports the convex second bearing coupling 206 (for example see FIGS. 23 to 26), even when load (for example a wheel) is applied to the assembly, until the angle between the wheel carrying bar 100 and support peg 200, 1200 is extreme enough (for example 20 deg or 25 deg or more) for the second bearing coupling 206 to slide out of the first bearing coupling 106 (for example as shown in FIG. 27). This "automatic" disengagement prevents the user from accidentally bending the apparatus using the lever force.

Hence there is provided a tool, tool set, a tool kit, a vehicle comprising a tool set, a method of fitting a wheel to a wheel hub of a vehicle and a tool kit further comprising instructions defining the method of fitting a wheel to a wheel hub of a vehicle.

Present workplace regulations in the United Kingdom stipulate that if an object is greater than 10 KG in weight, then some form of mechanical assist must be used if available. The apparatus of the present disclosure provides such mechanical assist for the problem of fitting wheels to cars.

The apparatus and method of the present disclosure provide a system for the easy fitting of a wheel to a vehicle which makes it easy to fit the wheel in the desired location on the hub of the vehicle, as well as requiring less effort on the part of the user to do so. This enables a wider range of users to be able to fit wheels to their vehicles, as well as preventing, or at least reducing the chance of, injury to a user through straining to fit a wheel using a method of the related art.

Hence the apparatus and method of the present disclosure contributes to the health and safety of the user, whether the user is a vehicle owner and hence only changes a wheel occasionally or a mechanic who may often need to install a wheel on a vehicle.

The use of the support peg 200, 1200 coupled to the wheel carrying bar 100 also enables the user to more easily line up the aperture 80 of the wheel 12 with its location point on the hub 40. This is because the user is only required to engage the wheel carrying bar 100 and support peg 200, 1200. After this, the wheel 12 is guided to the correct position by being slid along the wheel carrying bar 100 and support peg 200. Hence in poor light conditions (e.g. when dark) or in bad weather (e.g. raining or snow) the support peg 200 and wheel carrying bar 100 provides a means for guiding the wheel 12 to the correct position on the hub 40 which is easier than examples of the related art.

The apparatus of the present disclosure may be easily assembled and disassembled, and easily stowed in a vehicle for storage. Additionally, the apparatus of the present disclosure may be relatively inexpensively manufactured and provides a robust piece of equipment that is operable for use for many years. It may also be operated with minimal instruction so that even an inexperienced user may gain the benefit of the tool.

Joining the wheel carrying bar 100 and support peg 200, 1200 using a ball and a socket arrangement according the present disclosure, with the concave end on the wheel carrying bar 100 (i.e. the lever) and the support peg 200, 1200 having a convex end, is advantageous because, as shown in the sequence of FIGS. 23 to 27, the wheel carrying bar 100 will stay engaged with the support peg 200 over a large change in angle before becoming disconnected.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A tool set for fitting a wheel to a wheel hub of a vehicle, the wheel hub comprising wheel hub fixing features for fixing the wheel to the wheel hub, the tool set comprising:
   a wheel carrying bar comprising a first end, a second end, and a first wheel support region which extends away from the first end to a first bearing coupling provided at the second end; wherein the first bearing coupling of the wheel carrying bar comprises an opening at the second end from which extends a concave bearing surface which defines a cavity centred on a first coupling axis;
   a support peg comprising a third end, fourth end, a second bearing coupling being provided at the third end, and a second wheel support region extending away from the second bearing coupling towards a socket provided at the fourth end; wherein the third end of the second bearing coupling of the support peg comprises a male engagement member with a convex bearing surface which is centred on a second coupling axis;

wherein the socket is configured to be engaged with or located in/on one of the wheel hub fixing features;

wherein the socket is configured to fit into one of the wheel hub fixing features provided as a threaded passage for receiving a bolt;

the first bearing coupling is configured to receive and pivotably engage with the second bearing coupling to thereby form a pivotable joint; and the first bearing coupling and second bearing coupling being configured to disconnect.

2. A tool set as claimed in claim 1 wherein the first bearing coupling and the second bearing coupling are configured to form a floating joint while pivotably engaged.

3. A tool set as claimed in claim 1 wherein the concave bearing surface of the first bearing coupling has a convergent lead-in region which reduces in diameter from the opening to a minimum diameter (Dmin), from which extends a support region comprising a spherical surface.

4. A tool set as claimed in claim 3 wherein a first cylindrical region of the same diameter as the minimum diameter (Dmin) extends between the convergent lead-in region and the spherical surface.

5. A tool set as claimed in claim 3 wherein the convergent lead-in region comprises a first frustoconical region extending a length X1 at a first angle of inclination A1 relative to the first coupling axis.

6. A tool set as claimed in claim 5 wherein the convergent lead-in region comprises a second frustoconical region extending a length X2 at a second angle of inclination A2 relative to the first coupling axis, the second frustoconical region extending from the first frustoconical region;

the first frustoconical region spaced apart from the opening by the second frustoconical region, and the first angle of inclination A1 being less than the second angle of inclination A2.

7. A tool set as claimed in claim 6 wherein the convex bearing surface of the second bearing coupling is provided as a spherical surface; and a second cylindrical region, centred on the second coupling axis, extends a length X3 from the convex bearing surface along the second coupling axis some of the way towards the socket;

the convex bearing surface, the second cylindrical region and socket being provided in series along the second coupling axis.

8. A tool set as claimed in claim 7 wherein the length X1 of the first frustoconical region of the first bearing coupling is substantially the same as the length X3 of the second cylindrical region of the second bearing coupling.

9. A tool set as claimed in claim 7 wherein the second wheel support region comprises, in series:

a first sub-region which extends from the second cylindrical region, and the first sub-region increases in diameter along at least part of its length;

a second sub-region of constant diameter; and a third sub-region which increases in diameter along its length to the socket.

10. A tool set as claimed in claim 1 wherein the concave bearing surface of the first bearing coupling has a first radius;

the convex bearing surface of the second bearing coupling has a second radius; and the first radius is greater than the second radius.

11. A tool set as claimed in claim 1 wherein a slideable handle is provided on the wheel carrying bar, operable to slide along the first wheel support region, and along the second wheel support region to thereby push the wheel towards the socket along the wheel support region.

12. A tool set as claimed in claim 1 wherein the socket comprises a male section compatible with the threaded passage so that the male section is operable to be slid into the threaded passage.

13. A tool kit comprising:

a tool set comprising:

a wheel carrying bar comprising a first end, a second end, and a first wheel support region which extends away from the first end to a first bearing coupling provided at the second end; wherein the first bearing coupling of the wheel carrying bar comprises an opening at the second end from which extends a concave bearing surface which defines a cavity centred on a first coupling axis;

a support peg comprising a third end, fourth end, a second bearing coupling being provided at the third end, and a second wheel support region extending away from the second bearing coupling towards a socket provided at the fourth end; wherein the third end of the second bearing coupling of the support peg comprises a male engagement member with a convex bearing surface which is centred on a second coupling axis;

wherein the socket is configured to be engaged with or located in/on one of wheel hub fixing features;

wherein the socket is configured to fit onto one of the wheel hub fixing features provided as a threaded stud bolt for receiving a nut;

the first bearing coupling is configured to receive and pivotably engage with the second bearing coupling to thereby form a pivotable joint;

the first bearing coupling and second bearing coupling being configured to disconnect;

the tool kit further being operable to:

a. engage the socket of the support peg with the wheel hub fixing feature;

b. extend the wheel carrying bar through a fixing feature aperture on the wheel so that the wheel is carried on the first wheel support region of the wheel carrying bar;

c. engage the first bearing coupling of the wheel carrying bar with the second bearing coupling of the support peg;

d. pivot the wheel carrying bar relative to the support peg to lift the wheel;

e. move the wheel along the first wheel support region of the wheel carrying bar to the second end of the wheel carrying bar, across the pivotable joint and along the second wheel support region of the support peg towards the socket;

f. locate the wheel in place on the wheel hub;

g. disconnect the wheel carrying bar from the support peg;

h. fix the wheel in place on the wheel hub with the socket compatible with a further one of the wheel hub fixing features; and i. disengage the socket of the support peg from the wheel hub fixing feature.

14. A system for fixing a vehicle, the system comprising:
a wheel;
a wheel hub comprising wheel hub fixing features for fixing the wheel to the wheel hub;
a tool set comprising:
a wheel carrying bar comprising a first end, a second end, and a first wheel support region which extends away from the first end to a first bearing coupling provided at the second end; wherein the first bearing coupling of the wheel carrying bar comprises an opening at the second end from which extends a concave bearing surface which defines a cavity centred on a first coupling axis;
a support peg comprising a third end, fourth end, a second bearing coupling being provided at the third end, and a second wheel support region extending away from the second bearing coupling towards a socket provided at the fourth end; wherein the third end of the second bearing coupling of the support peg comprises a male engagement member with a convex bearing surface which is centred on a second coupling axis;
wherein the socket is configured to be engaged with or located in/on one of the wheel hub fixing features;
wherein the socket is configured to fit into one of the wheel hub fixing features provided as a threaded passage for receiving a bolt;
the first bearing coupling is configured to receive and pivotably engage with the second bearing coupling to thereby form a pivotable joint; and
the first bearing coupling and second bearing coupling being configured to disconnect.

* * * * *